United States Patent
Tanimoto

(10) Patent No.: US 8,952,588 B2
(45) Date of Patent: Feb. 10, 2015

(54) DISK MOTOR AND ELECTRIC WORKING MACHINE INCLUDING THE SAME

(75) Inventor: Hideyuki Tanimoto, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 209 days.

(21) Appl. No.: 13/419,389

(22) Filed: Mar. 13, 2012

(65) Prior Publication Data

US 2012/0242185 A1 Sep. 27, 2012

(30) Foreign Application Priority Data

Mar. 22, 2011 (JP) .................................. 2011-061976

(51) Int. Cl.
*H02K 3/04* (2006.01)

(52) U.S. Cl.
USPC ............................................ 310/208; 310/268

(58) Field of Classification Search
CPC .......... H02K 3/26; H02K 23/54; H02K 23/56
USPC ............................ 310/266, 267, 268, 208, 43
See application file for complete search history.

(56) References Cited

U.S. PATENT DOCUMENTS

| | | | | | |
|---|---|---|---|---|---|
| 3,500,095 | A | * | 3/1970 | Keogh | 310/268 |
| 3,566,165 | A | * | 2/1971 | Lohr | 310/67 R |
| 4,021,692 | A | * | 5/1977 | Whiteley | 310/237 |
| 4,068,143 | A | * | 1/1978 | Whiteley | 310/268 |
| 4,605,873 | A | * | 8/1986 | Hahn | 310/154.06 |
| 4,633,112 | A | * | 12/1986 | Miyake | 310/90 |

FOREIGN PATENT DOCUMENTS

| | | |
|---|---|---|
| CN | 2653772 Y | 11/2004 |
| JP | 56-29452 A | 3/1981 |
| JP | 59-159658 A | 9/1984 |
| JP | 59-216457 A | 12/1984 |
| JP | 61-258660 A | 11/1986 |
| JP | 62-247749 A | 10/1987 |
| JP | 3-15250 A | 1/1991 |
| JP | 5-43756 U | 6/1993 |
| JP | 11-252833 A | 9/1999 |
| JP | 2003-299288 A | 10/2003 |
| JP | 2006-42506 A | 2/2006 |
| JP | 2006-304547 A | 11/2006 |
| JP | 2007-82393 A | 3/2007 |

OTHER PUBLICATIONS

Chinese Office Action for the related Chinese Patent Application No. 201210067170.2 dated Feb. 8, 2014.
Copy of Japanese Office Action for the related Japanese Patent Application No. 2011-061976 dated Sep. 24, 2014.

\* cited by examiner

*Primary Examiner* — Hanh Nguyen
(74) *Attorney, Agent, or Firm* — Kenealy Vaidya LLP

(57) ABSTRACT

A disk motor including: a rotor; a stator; at least one coil disk provided to one of the rotor and the stator; at least one magnet provided to the other of the rotor and the stator and facing a coil pattern of the coil disk; a current supply part for supplying current to the coil pattern; and an output shaft rotated by a rotating force of the rotor, wherein an insulating resin layer is provided between the coil pattern and the magnet.

13 Claims, 16 Drawing Sheets

1: BRUSHCUTTER

1: BRUSHCUTTER

81: STATOR

FIG. 5
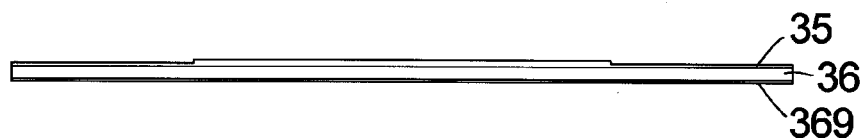
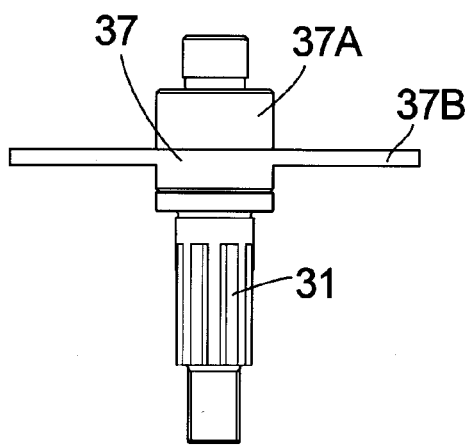
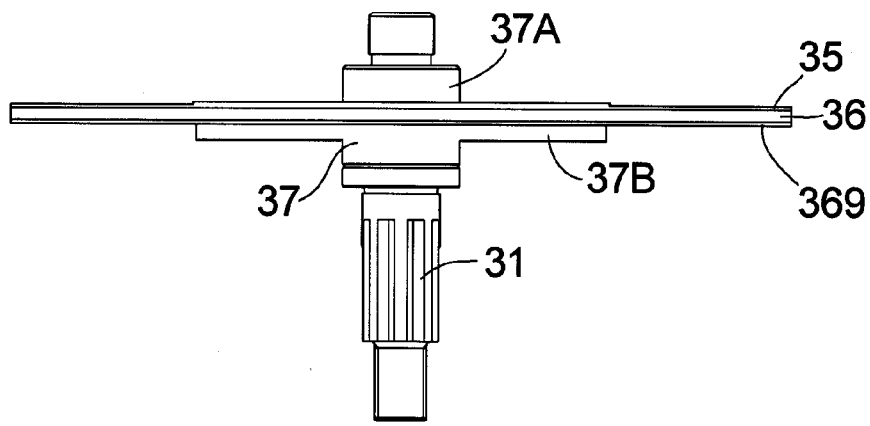

361: FIRST COIL DISK (UPPER SURFACE)

361: FIRST COIL DISK (LOWER SURFACE)

82: ROTOR

FIG. 17
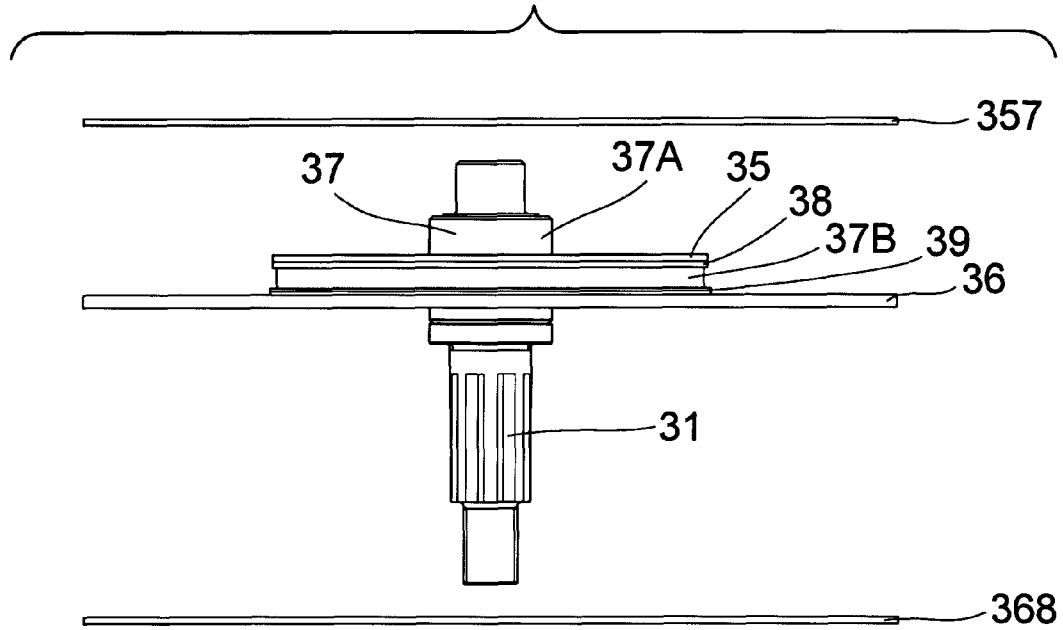
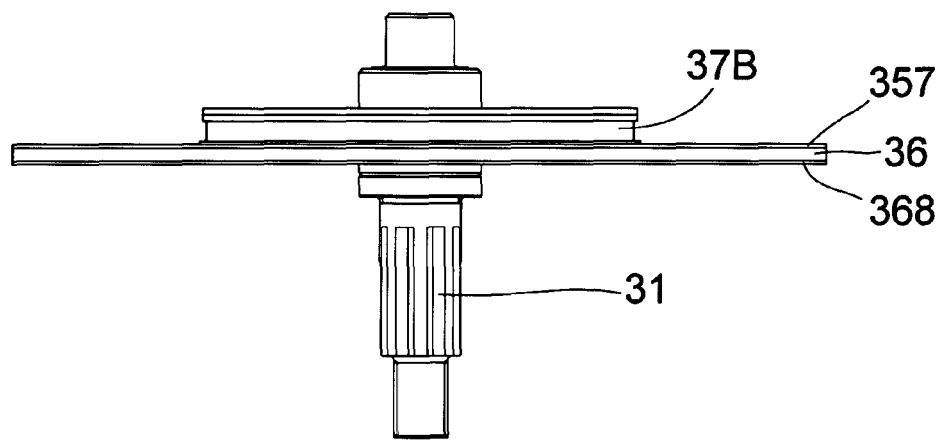

DISK MOTOR AND ELECTRIC WORKING MACHINE INCLUDING THE SAME

CROSS-REFERENCE TO RELATED APPLICATIONS

This application claims priority from Japanese Patent Application No. 2011-061976 filed on Mar. 22, 2011, the entire contents of which are incorporated herein by reference.

TECHNICAL FIELD

Aspects of the present invention relate to a disk motor which has a coil disk and rotates and drives an output shaft, and an electric working machine including the disk motor.

BACKGROUND

A related-art disk motor mainly includes an output shaft, a coil disk fixed to the output shaft, having substantially a circular plate shape and on which a coil pattern is printed, a commutator connected to the coil pattern, a magnet disposed so as to face the coil pattern, and a brush for supplying current to the commutator (see JP-A-2003-299288).

A number of rotations of the disk motor is determined by a voltage supplied from the brush, a current of the disk motor, the coil pattern of the coil disk, a magnetic flux of the magnet, the number of brushes (the number of poles), etc. When the voltage supplied from the brush and the current of the disk motor are constant, the disk motor can be set at a desired number of rotations by changing the coil pattern of the coil disk, the magnetic flux of the magnet or the number of brushes.

SUMMARY

A rare metal called dysprosium is mixed to a neodymium magnet used in a high-performance motor and thereby, thermal demagnetization is reduced to improve heat resistance performance. However, China accounts for about 90% of the worldwide production of dysprosium, and the price of dysprosium has risen rapidly. Because of this, a technique for making full use of a low-cost neodymium magnet which uses a small amount of dysprosium (that is, having a low heatproof temperature) has been desired.

The invention has been implemented in view of such situation, and an object of the invention is to provide a disk motor having a structure in which thermal demagnetization is difficult to occur by reducing heating of the magnet by suppressing heat transfer from a rotor to a magnet. Another object of the invention is to provide and an electric working machine including such disk motor.

According to a first aspect of the invention, there is provided a disk motor including: a rotor; a stator; at least one coil disk provided to one of the rotor and the stator; at least one magnet provided to the other of the rotor and the stator and facing a coil pattern of the coil disk; a current supply part for supplying current to the coil pattern; and an output shaft rotated by a rotating force of the rotor, wherein an insulating resin layer is provided between the coil pattern and the magnet.

In the disk motor, the rotor may include a commutator disk and the at least one coil disk, the stator may include the at least one magnet facing the coil pattern of the coil disk, and the current supply part may supply current to the coil pattern through the commutator disk In the disk motor, the insulating resin layer may contact with a facing surface of the magnet that faces the coil disk and may cover at least a part of the facing surface.

The disk motor may further include a case configured to hold the magnet and cover at least the commutator disk and the coil disk, and the insulating resin layer may be adhered to an inside of the case so as to cover the facing surface of the magnet.

In the disk motor, the case may be made of metal.

In the disk motor, the insulating resin layer may contact with a facing surface of the coil disk that is nearest to the magnet and may cover at least a part of the facing surface of the coil disk.

In the disk motor, the insulating resin layer may be an insulating resin substrate that has a diameter substantially the same as a diameter of the coil disk, may not have a conductive pattern and may be laminated and integrated with the facing surface of the coil disk.

In the coil disk, the insulating resin layer may be a tape made of insulating resin.

In the coil disk, the stator may include a plurality of magnets arranged in a circle, and first and second ring-shaped yokes that follows the circle of the arranged plural magnets when viewed in an axial direction of the output shaft, and the coil disk may be positioned between the first yoke and the plural magnets, and the plural magnets may be positioned between the coil disk and the second yoke.

The coil disk may further include a second insulating resin which covers at least a part of a facing surface of the first yoke that faces the coil disk.

The coil disk mat further including a third insulating resin layer which covers at least a part of an opposite surface of the coil disk that is farthest from the magnet, the opposite surface being opposite to the magnet.

In the coil disk, the second insulating resin layer may be an insulating resin substrate that has a diameter substantially the same as a diameter of the coil disk, may not have a conductive pattern and may be laminated and integrated with the opposite surface of the coil disk that is farthest from the magnet.

In the coil disk, the second insulating resin layer may be a tape made of insulating resin.

In the coil disk, the commutator disk may be configured by forming a commutator pattern to an insulating resin substrate that has a diameter substantially the same as a diameter of the coil disk, may be laminated coaxially with the coil disk and may include a commutator pattern unformed portion at a region which is spaced from a center thereof by a predetermined distance or more.

In the coil disk, the insulating resin layer may be provided between the coil pattern and the magnet in an axial direction of the output shaft.

According to a second aspect of the invention, there is provided an electric working machine including the disk motor of the first aspect of the invention.

In addition, any combinations of the components described above or conversions of representation of the invention between methods, systems, etc. are also effective as aspects of the invention.

According to the invention, a structure in which thermal demagnetization is difficult to occur is realized by reducing heating of the magnet by suppressing heat transfer from a rotor to a magnet by using the insulating resin layer.

BRIEF DESCRIPTION OF DRAWINGS

FIG. 5 is an assembly explanatory diagram of a rotor 82 shown in FIG. 2;

FIG. 17 is an explanatory diagram of sticking an insulating resin tape on a coil part of FIG. 15;

DETAILED DESCRIPTION

Exemplary embodiments of the invention will hereinafter be described in detail with reference to the drawings. The same numerals are assigned to the same or equivalent components, members, processing, etc. shown in each of the drawings, and repetitive explanation is properly omitted. Also, the exemplary embodiments do not limit the invention and combinations or all the features described in the exemplary embodiments are not necessarily the essence of the invention.

First Exemplary Embodiment

Figure 1:
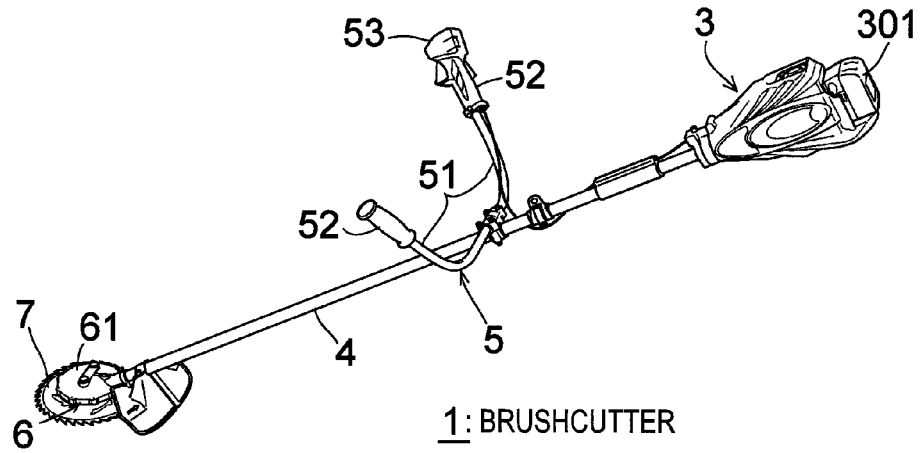
FIG. 1 is a perspective view of a brushcutter 1 according to a first exemplary embodiment of the invention.

FIG. 1 is a perspective view of a brushcutter 1 according to a first exemplary embodiment of the invention. The brushcutter 1 illustrating an electric working machine includes a power source part 3, a pipe part 4, a handle part 5, a driving part 6 and a blade 7.

The power source part 3 detachably has a battery 301 used as a power source. The pipe part 4 mechanically connects (coupling) the power source part 3 and the driving part 6. Also, wiring (not shown) for electrically connecting the power source part 3 and the driving part 6 is inserted into the pipe part 4. By this wiring, electric power is supplied from the power source part 3 to the driving part 6. The driving part 6 accommodates a disk motor inside a case 61, and rotates and drives the blade 7 by the electric power supplied from the power source part 3. A configuration of the disk motor will be described later.

The handle part 5 is attached to and fixed to the middle of the pipe part 4, that is, between the power source part 3 and the driving part 6. The handle part 5 is configured by respectively attaching grips 52 to the ends of a pair of arms 51. One grip 52 is provided with a throttle 53. An operator can adjust electric power supplied to the driving part 6, that is, can adjust the number of rotations of the blade 7 by manipulating the throttle 53. The blade 7 has substantially a circular plate shape, and saw teeth are formed at the peripheral edge of the blade 7. Further, a hole (not shown) mounted to an output shaft of the disk motor described later is formed at the center of the blade 7.

Figure 2:
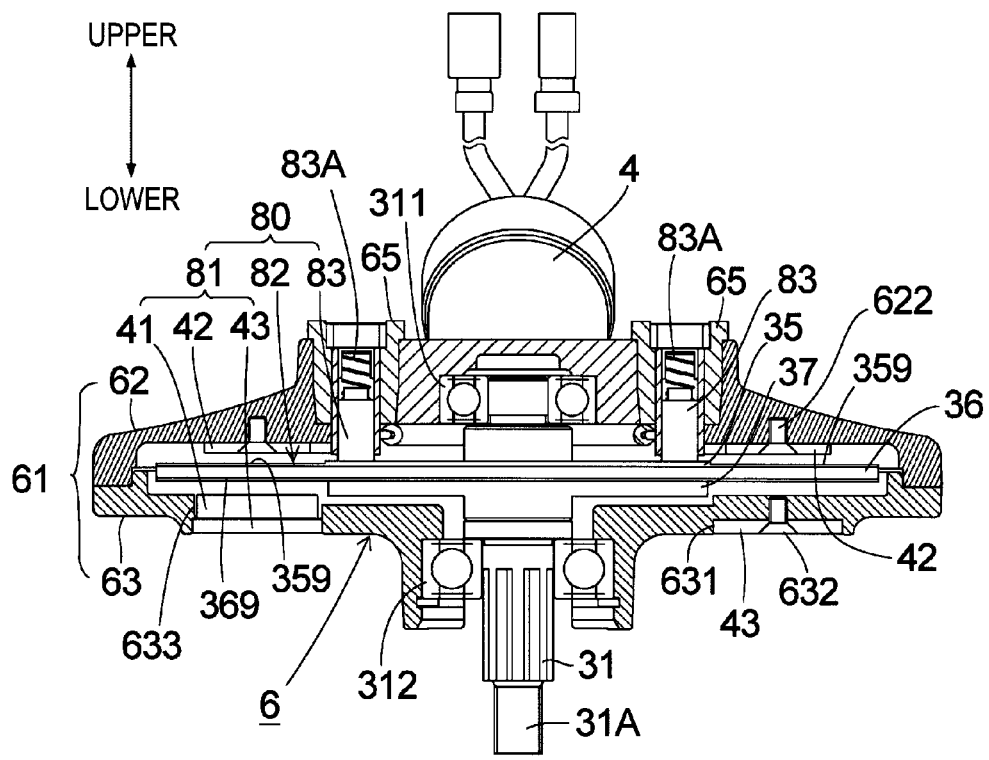
FIG. 2 is a front sectional view of a driving part 6 of the brushcutter 1 shown in FIG. 1.

FIG. 2 is a front sectional view of the driving part 6 of the brushcutter 1 shown in FIG. 1. As shown in FIG. 2, an extension direction of an output shaft 31 is defined as a vertical direction. The driving part 6 has a disk motor 80 inside the case 61 made of metal such as aluminum. The case 61 is configured by fitting and integrating a cover part 62 and a base part 63. The disk motor 80 has a stator 81, a rotor 82 and a pair of brushes 83. The pair of brushes 83 is formed symmetrically with respect to the rotary shaft (output shaft 31) of the disk motor 80 and is supported by a brush holder 65 of the cover part 62. Each of the brushes 83 is urged to a side of a commutator disk 35 (lower side) by a spring 83A so that a lower surface of the brush 83 abuts on a commutator pattern of a conductor such as copper on the commutator disk 35 described later. The brushes 83 are connected to the power source part 3 of FIG. 1, and function as a current supply part for supplying a current to a coil pattern (described below) of the rotor 82.

The stator 81 has magnets 41 as a magnetic flux generation part, an upper yoke 42 and a lower yoke 43 which are soft magnetic materials. The ring-shaped upper yoke 42 is fixed to a lower surface of the cover part 62 by, for example, a screw 622. The ring-shaped lower yoke 43 having substantially the same diameter as a diameter of the upper yoke 42 is fixed inside a ring-shaped groove part 631 formed in a lower surface of the base part 63 by, for example, a screw 632. The magnets 41 are fitted and fixed inside a hole part 633 formed to an upper surface of the base part 63.

Figure 3:
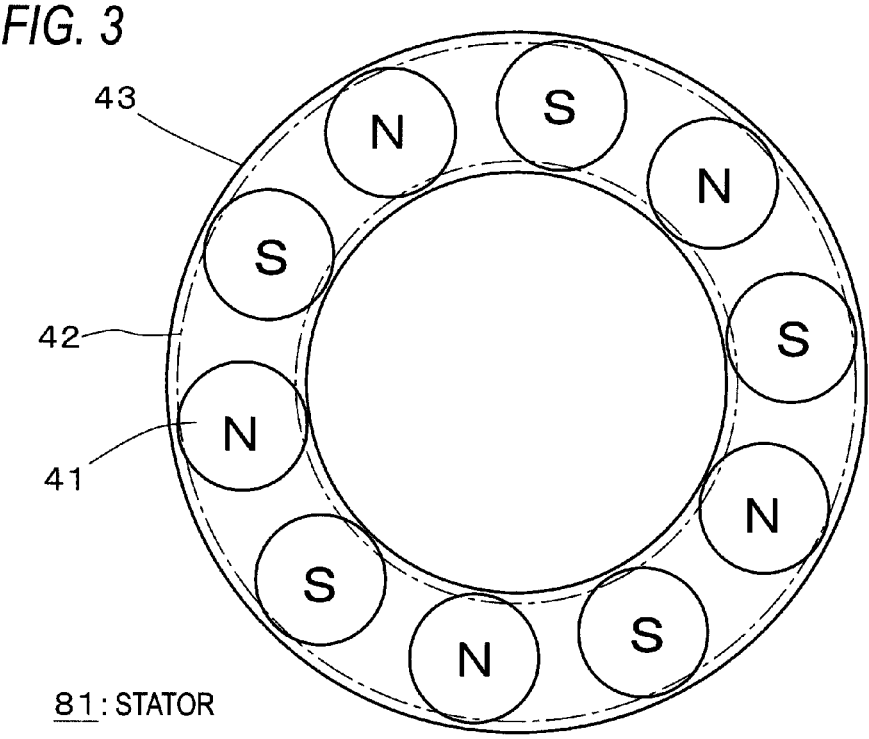
FIG. 3 is a schematic plan view of a stator 81 shown in FIG. 2.

FIG. 3 is a schematic plan view of the stator 81 shown in FIG. 2. As shown in FIG. 3, for example, ten magnets 41 with, for example, a circular plate shape are juxtaposed in a circle at an equiangular pitch (the hole parts 633 (FIG. 2) for receiving the magnets 41 are also juxtaposed in a circle by the same number). The center of the circle substantially matches with the center of rotation of the disk motor 80. In the adjacent magnets 41, magnetic poles of upper surfaces differ mutually. As the magnet 41, a rare-earth magnet such as a neodymium magnet is preferably used, but a sintered magnet such as a ferrite magnet may also be used. The upper yoke 42 and the lower yoke 43 increase the density of magnetic flux applied to the coil pattern of the rotor 82 described later.

As shown in FIG. 2, the rotor 82 has the output shaft 31 (rotor shaft), the commutator disk 35, a coil part 36 and a support member 37. The output shaft 31 is rotatably supported by upper side bearings 311 fixed to the cover part 62 and lower side bearings 312 fixed to the base part 63. A male screw 31A is formed at the downward end of the output shaft 31, and the blade 7 of FIG. 1 is fixed thereto by a fastener (not shown). An upper surface of the commutator disk 35 is a sliding surface of the brush 83. Current is supplied from the power source part 3 shown in FIG. 1 to the coil part 36 through the brushes 83 and the commutator disk 35.

Figure 4:
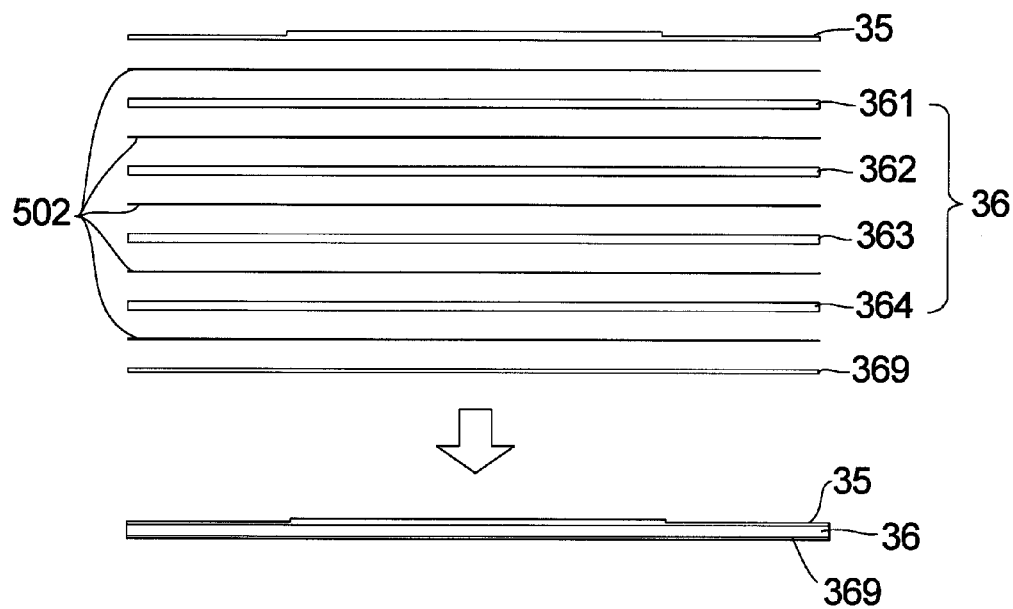
FIG. 4 is an assembly explanatory diagram of a commutator disk 35 and a coil part 36 shown in FIG. 2.

FIG. 4 is an assembly explanatory diagram of the commutator disk 35 and the coil part 36 shown in FIG. 2. The coil part 36 includes a first coil disk 361, a second coil disk 362, a third coil disk 363 and a fourth coil disk 364. The commutator disk 35, the first coil disk 361 to the fourth coil disk 364 and an insulating resin substrate 369 (for example, a glass fiber reinforced epoxy resin substrate that does not have a conductive pattern) as an insulating resin layer are laminated with sheet-shaped adhesive layers 502 (insulation properties) sandwiched therebetween. The sheet-shaped adhesive layers 502 have the same shape as that of each of the coil disks in axial view, and substantially the whole surface of each of the coil disks is covered with the adhesive layer 502.

Each of the first coil disk 361 to the fourth coil disk 364 is obtained by forming a coil pattern described later on both surfaces of an insulating resin substrate (for example, a glass fiber reinforced epoxy resin substrate). The commutator disk 35 is obtained by forming a commutator pattern described below on an insulating resin substrate (for example, a glass fiber reinforced epoxy resin substrate) with substantially the same diameter as that of each of the coil disks, and is adhered and fixed to an upper surface of the coil part 36. The insulating resin substrate 369 has substantially the same diameter as that of each of the coil disks, and is adhered to a lower surface of the coil part 36.

FIG. 5 is an assembly explanatory diagram of the rotor 82 shown in FIG. 2. The support member 37 made of metal such as aluminum, which is coaxially fixed to the output shaft 31, includes a cylindrical part 37A having a substantially cylindrical shape and a boss 37B (flange) having a substantially circular plate shape. The boss 37B has a diameter smaller than that of each of the coil disks, and projects outwardly from a side surface of the cylindrical part 37A in a direction perpendicular to the output shaft 31. A rotor substrate group laminated as shown in FIG. 4 is placed on an upper surface of the boss 37B through a sheet-shaped adhesive layer (not shown) having the same shape as that of the boss 37B when viewed in an axial direction, and the commutator disk 35, the coil part 36, the insulating resin substrate 369 and the boss 37B are adhered and integrated in a laminated state by, for example, hot pressing (pressurization in a lamination direction in a heated state).

Figure 6:
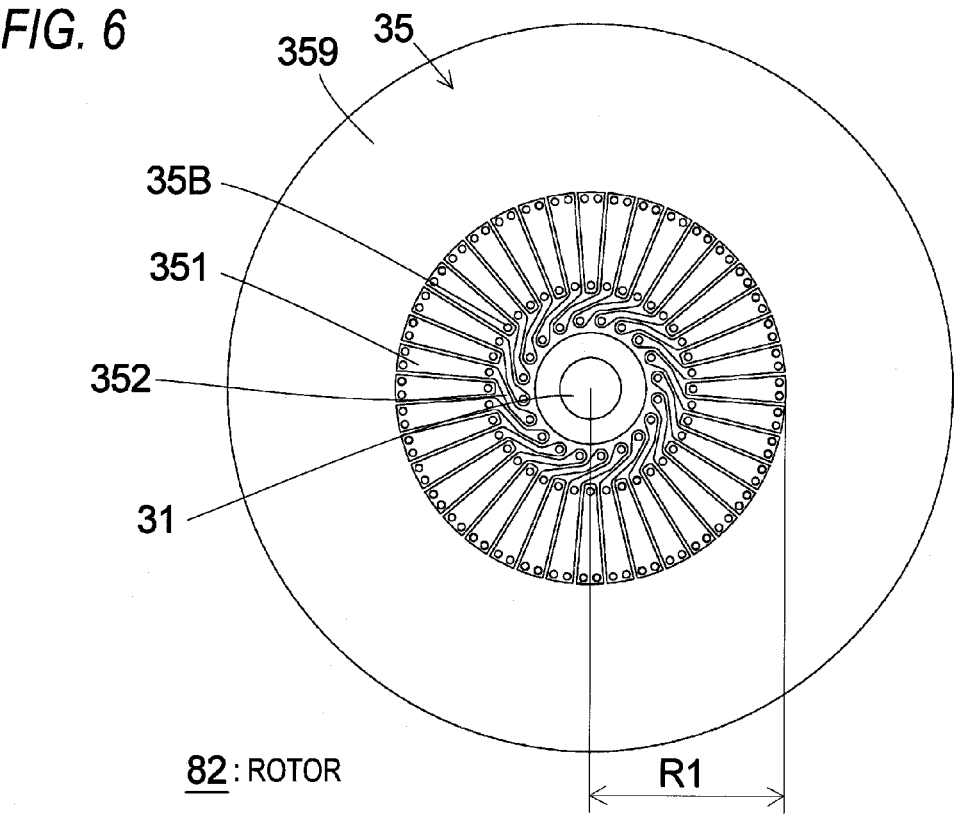
FIG. 6 is a plan view of the rotor 82 shown in FIG. 2.

FIG. 6 is a plan view of the rotor 82 shown in FIG. 2. As is evident from FIG. 6, a commutator pattern 351 exists in a region within a radius R1 from the center of the commutator disk 35 when viewed in an axial direction of the output shaft 31. On the other hand, a ring-shaped region spaced from the center of the commutator disk 35 by the radius R1 or more when viewed in the axial direction of the output shaft 31 is a commutator pattern unformed portion 359. At the commutator pattern unformed portion 359, a conductive pattern such as the commutator pattern is not formed. An upper surface of the first coil disk 361 (the coil disk of the uppermost layer) is covered with the commutator disk 35. That is, also as shown in FIG. 2, the commutator pattern unformed portion 359 is an insulating resin layer with which a surface of the first coil disk 361 facing the upper yoke 42 is covered.

Through holes 35B are formed at an equal distance from the center of the commutator disk 35 by a predetermined number. Several through holes 35B conduct to through holes of at least one coil disk. The commutator pattern 351 is radially divided into 40 segments. The two segments between which seven segments are sandwiched (for example, the first and ninth segments, the second and tenth segments) are mutually connected by a connection pattern 352 formed on the inside and a connection pattern (not shown) formed on an opposite surface.

Figure 7:
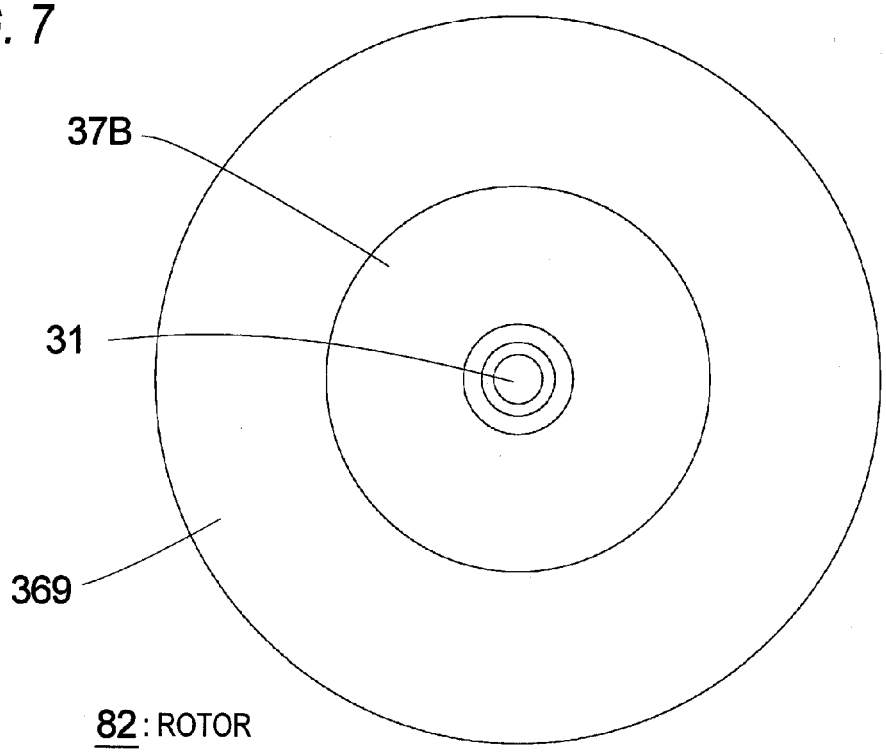
FIG. 7 is a bottom view of the rotor 82 shown in FIG. 2.

FIG. 7 is a bottom view of the rotor 82. A lower surface of the fourth coil disk 364 (the coil disk of the lowermost layer) is covered with the insulating resin substrate 369. That is, also as shown in FIG. 2, the insulating resin substrate 369 is an insulating resin layer with which a surface of the fourth coil disk 364 facing the magnets 41 is covered.

Figure 8A:
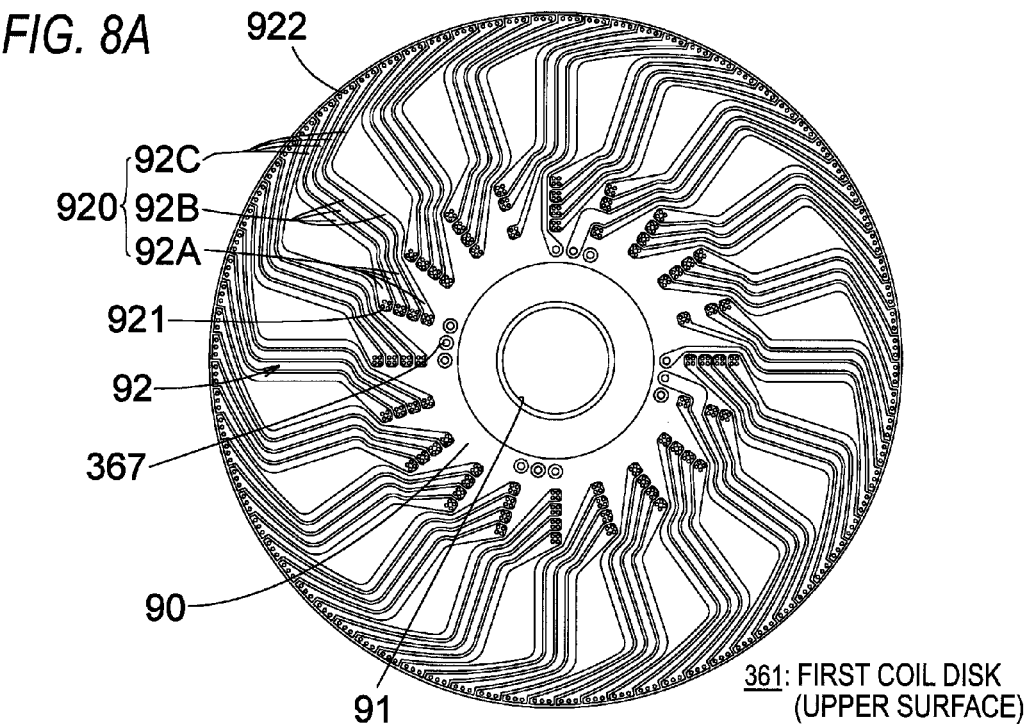
FIG. 8A is a plan view of a first coil disk 361 shown in FIG. 4.
Figure 8B:
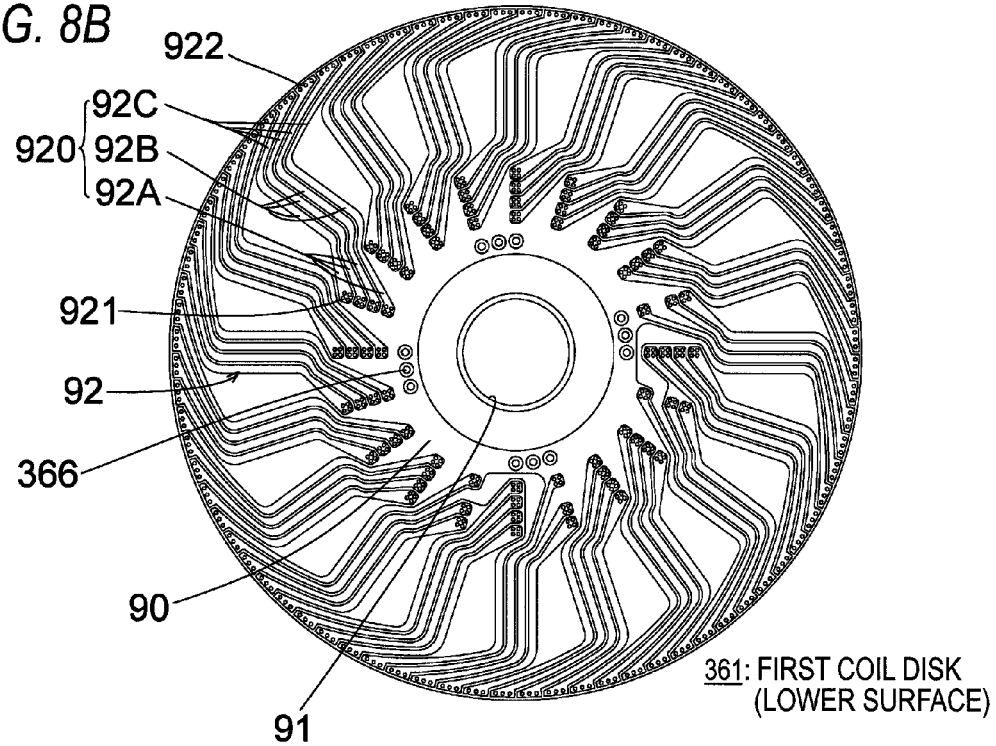
FIG. 8B is a bottom view of the same coil disk.

FIG. 8A is a plan view of the first coil disk 361 shown in FIG. 4. FIG. 8B is a bottom view of the same coil disk. Since the other coil disks have the same structure as the first coil disk 361 and have the same coil pattern, details of only the first coil disk 361 will be described hereinafter.

The first coil disk 361 respectively has coil patterns 92 on both surfaces of an insulating substrate 90 with a circular plate shape. A through hole 91 in the center of the insulating substrate 90 is a hole into which the cylindrical part 37A of FIG. 5 is inserted. A total of 12 through holes 366 for communicating between layers are formed by three through holes every angle of 90 degrees from the center of the insulating substrate 90. Distances from each of the through holes 366 to the center of the insulating substrate 90 are mutually equal. Each of the through holes 366 communicates with one of the through holes 35B formed in the commutator disk 35.

The coil pattern 92 made of copper or other conductive materials has 20 partial coil pattern groups 920 configured of mutually proximal patterns of four lines with substantially the same width per one surface. In the partial coil pattern group 920, inside communication pattern groups 92A, radial pattern groups 92B and outside communication pattern groups 92C are connected sequentially. Electrical connection between the inside communication pattern groups 92A of both surfaces is mutually performed by through holes 921 formed in the vicinity of the end. Electrical connection between the outside communication pattern groups 92C of both surfaces is mutually performed by through holes 922 formed in the vicinity of the end. The radial pattern groups 92B extend from the center side of the insulating substrate 90 to the outside in the radial direction, and pass between the inside communication pattern groups 92A and the outside communication pattern groups 92C. The mutual radial pattern groups 92B of both surfaces exist at substantially the same position when viewed in the axial direction. The mutual radial pattern groups 92B of each surface exist at an equiangular pitch from the center of the insulating substrate 90. The radial pattern groups 92B are positioned just above an arrangement circle (a circle in which the center of each of the magnets 41 is arranged) of the magnets 41 shown in FIGS. 2 and 3. In other words, with rotation of each coil disk, the radial pattern groups 92B pass just above the magnets 41. A rotating force is obtained by an electromagnetic force between a current passing through the radial pattern groups 92B and a magnetic field generated by the magnets 41.

Figure 9A:
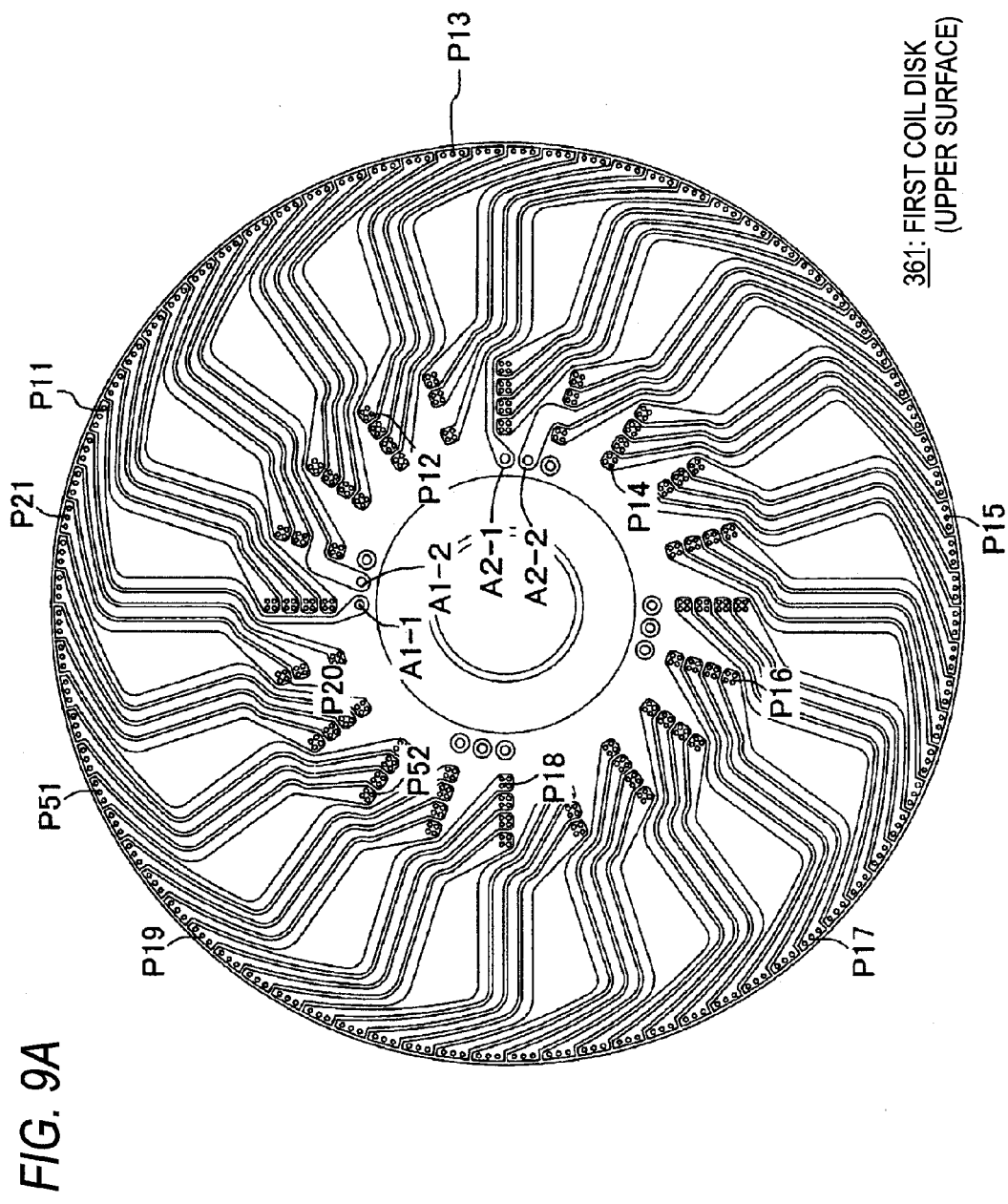
FIG. 9 (9A, 9B) is a coil pattern explanatory diagram of the first coil disk 361.
Figure 9B:
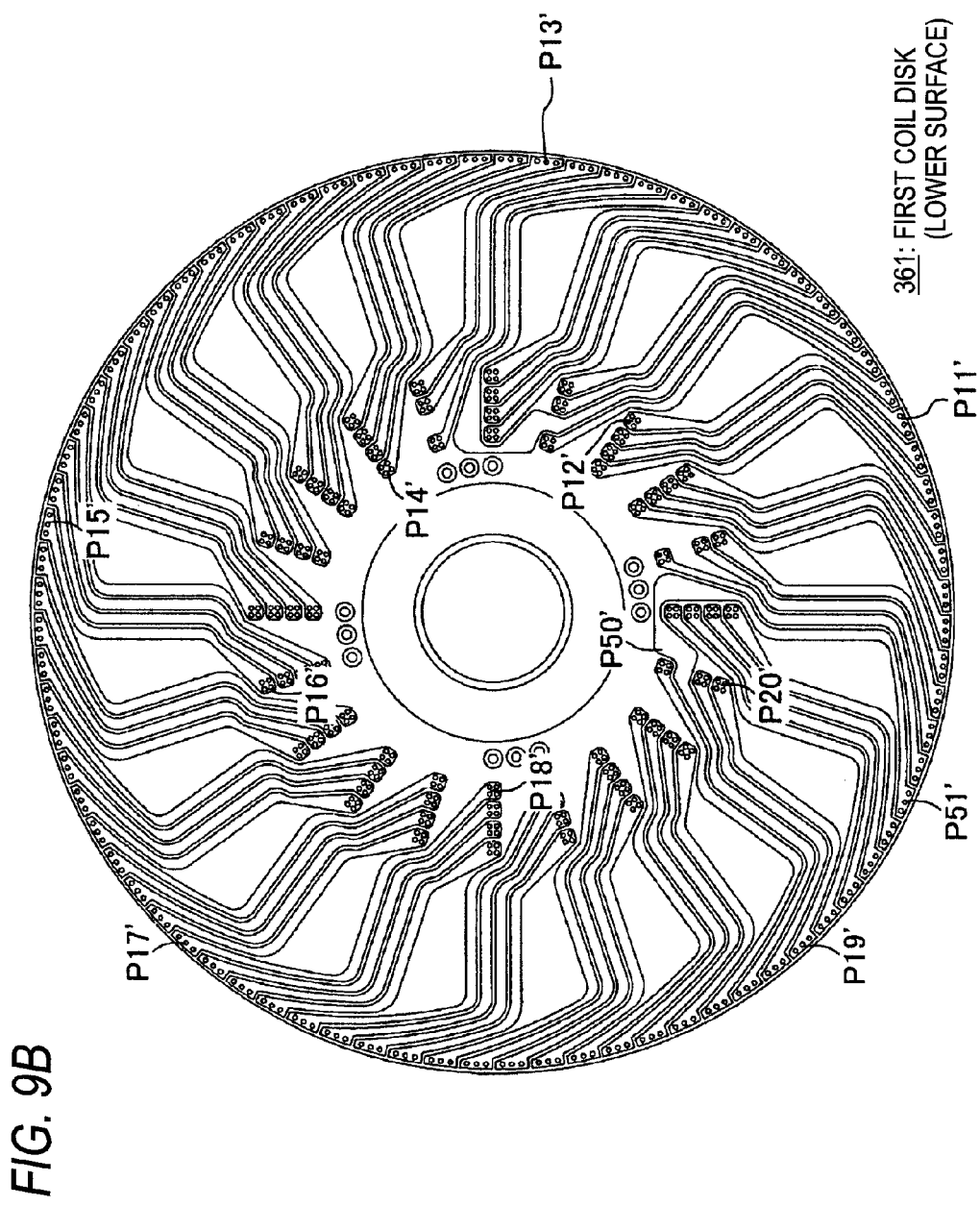

FIGS. 9A and 9B are coil pattern explanatory diagrams of the first coil disk 361. In addition, these diagrams are the same as FIGS. 8A and 8B except for the assigned numerals. The coil pattern 92 of the first coil disk 361 includes two coils. In FIG. 9A, a starting point of one coil is shown by A1-1 and an ending point is shown by A1-2. Also, in FIG. 9A, a starting point of the other coil is shown by A2-1 and an ending point is shown by A2-2. One coil connects from the starting point A1-1 to points P11, P11', P12', P12, P13, P13', ..., P19', P20'. This results in one round in a clockwise direction from the starting point A1-1 when viewed from above. Similarly, a total of four rounds in a clockwise direction are made to reach a point P50'. Then, in turn, from the point P50' to points P51', P51, ..., a total of four rounds in a counterclockwise direction are made to reach the ending point A1-2. The other coil similarly connects from the starting point A2-1 to the ending point A2-2.

A relation of connection between one coil which the first coil disk 361 includes and the commutator pattern 351 of the commutator disk 35 is constructed so that when a commutator pattern to which the starting point A1-1 is connected conducts one brush 83, a commutator pattern to which the ending point A1-2 is connected conducts the other brush 83. The same applies to the other coil (the starting point A2-1, the ending point A2-2). Also, the same applies to coils which the other coil disks include. Each coil is energized from the brushes 83 through the commutator disk 35 so that the radial pattern groups 92B of each coil disk passing magnetic pole surfaces of the magnets 41 generate rotating torques of the same direction.

According to the present exemplary embodiment, the following effects can be achieved.

(1) Since the lower surface (the surface facing the magnets 41) of the fourth coil disk 364 nearest to the magnets 41 is covered with the insulating resin substrate 369, a heat-insulated structure is realized in which heat generation from the coil part 36 (particularly, heat generation from the coil pattern on the lower surface of the fourth coil disk 364) at the time of operating the motor is resistant to transferring to the magnets 41 as compared with the case of exposing the surface. As a result, thermal demagnetization of the magnets 41 can be prevented, and a low-cost neodymium magnet with small usage of dysprosium (that is, having a low heatproof temperature) can be used as the magnets 41.

(2) A region of the upper surface (the surface opposite to the magnets 41) of the first coil disk 361 farthest from the magnets 41, which is spaced from the center by the distance R1 or more when viewed in the axial direction of the output shaft 31, is covered with the commutator pattern unformed portion 359 of the commutator disk 35. Accordingly, a heat-insulated structure in which heat generation from the coil part 36 (particularly, heat generation from the coil pattern on the upper surface of the first coil disk 361) at the time of operating the motor is resistant to transferring to the upper yoke 42 and the cover part 62 of the case 61 as compared with the case of exposing the region, that is, the case where the commutator disk 35 has the minimum radius (roughly equal to R1). As a result, heat transferring to the magnets 41 through the upper yoke 42 and the case 61 decreases, and thermal demagnetization of the magnets 41 can be prevented, and cost of the magnets can be reduced.

(3) The insulating resin substrate 369 and the commutator pattern unformed portion 359 of the commutator disk 35 are also useful from the standpoint of ensuring insulation properties (insulation distance) between the coil part 36 and the case 61. When ensuring insulation properties by enlarging the case 61 so as to keep a distance between the coil part 36 and the case 61, a distance from the magnets 41 to the coil part 36 and the upper yoke 42 increases, thereby decreasing performance. Further, enlarging the case is contrary to a demand for downsizing. Accordingly, the insulating resin substrate 369 and the commutator pattern unformed portion 359 of the commutator disk 35 contributes much to ensuring insulation properties while minimizing the space distance.

(4) The commutator pattern unformed portion 359 of the commutator disk 35 on the upper surface of the coil part 36 has functions of both heat insulation and insulation as described above. Therefore, with respect to heat insulation and insulation of the upper surface of the coil part 36, extra cost is not required other than the cost for increasing a diameter of the commutator disk 35, and therefore, the cost can be lowered.

(5) Since the insulating resin substrate 369 and the commutator pattern unformed portion 359 of the commutator disk 35 are strongly adhered to the coil part 36 by hot pressing, there is a low risk of being peeled from the coil part 36 even when the rotor 82 is rotated at high speed.

Second Exemplary Embodiment

Figure 10:
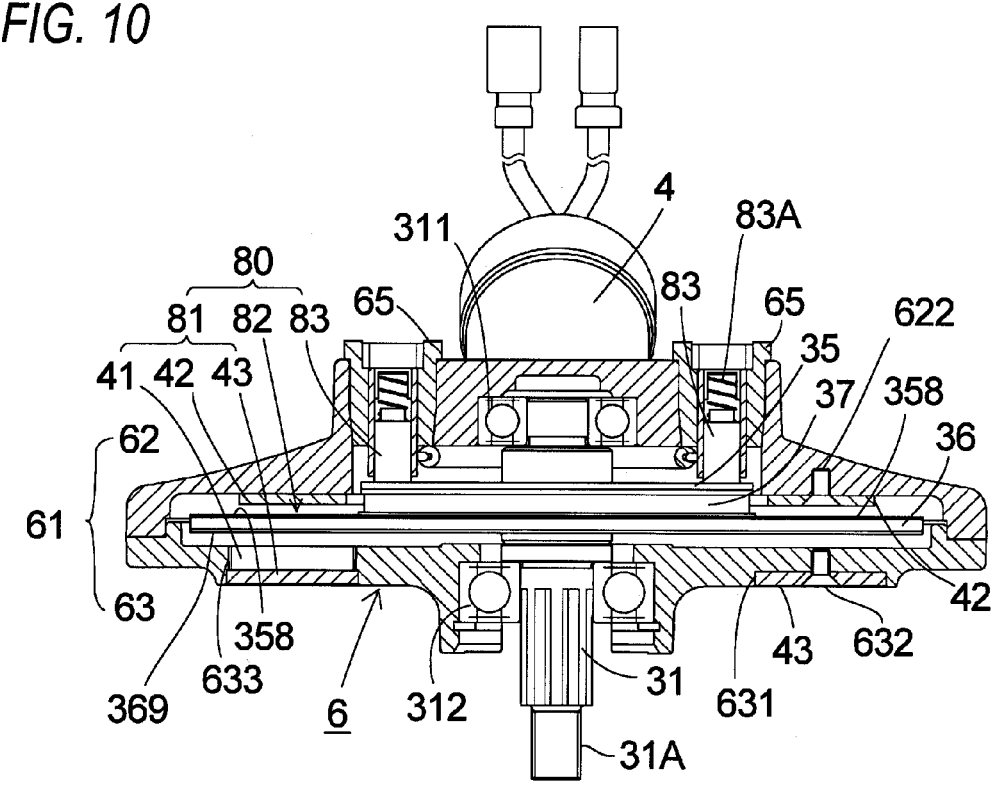
FIG. 10 is a front sectional view of a driving part 6 of a brushcutter according to a second exemplary embodiment of the invention.
Figure 11:
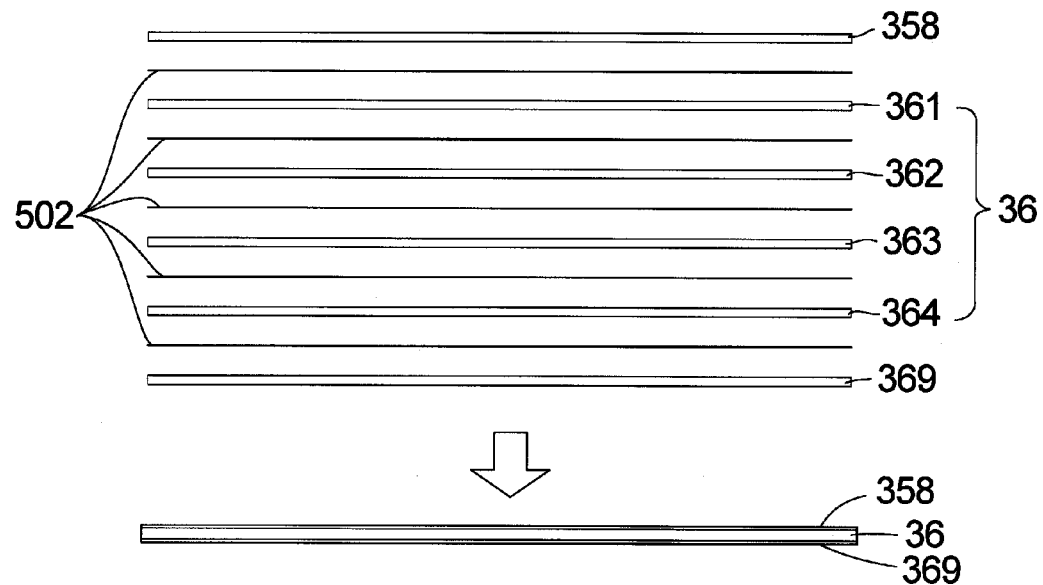
FIG. 11 is an assembly explanatory diagram of a coil part 36 shown in FIG. 10.
Figure 12:
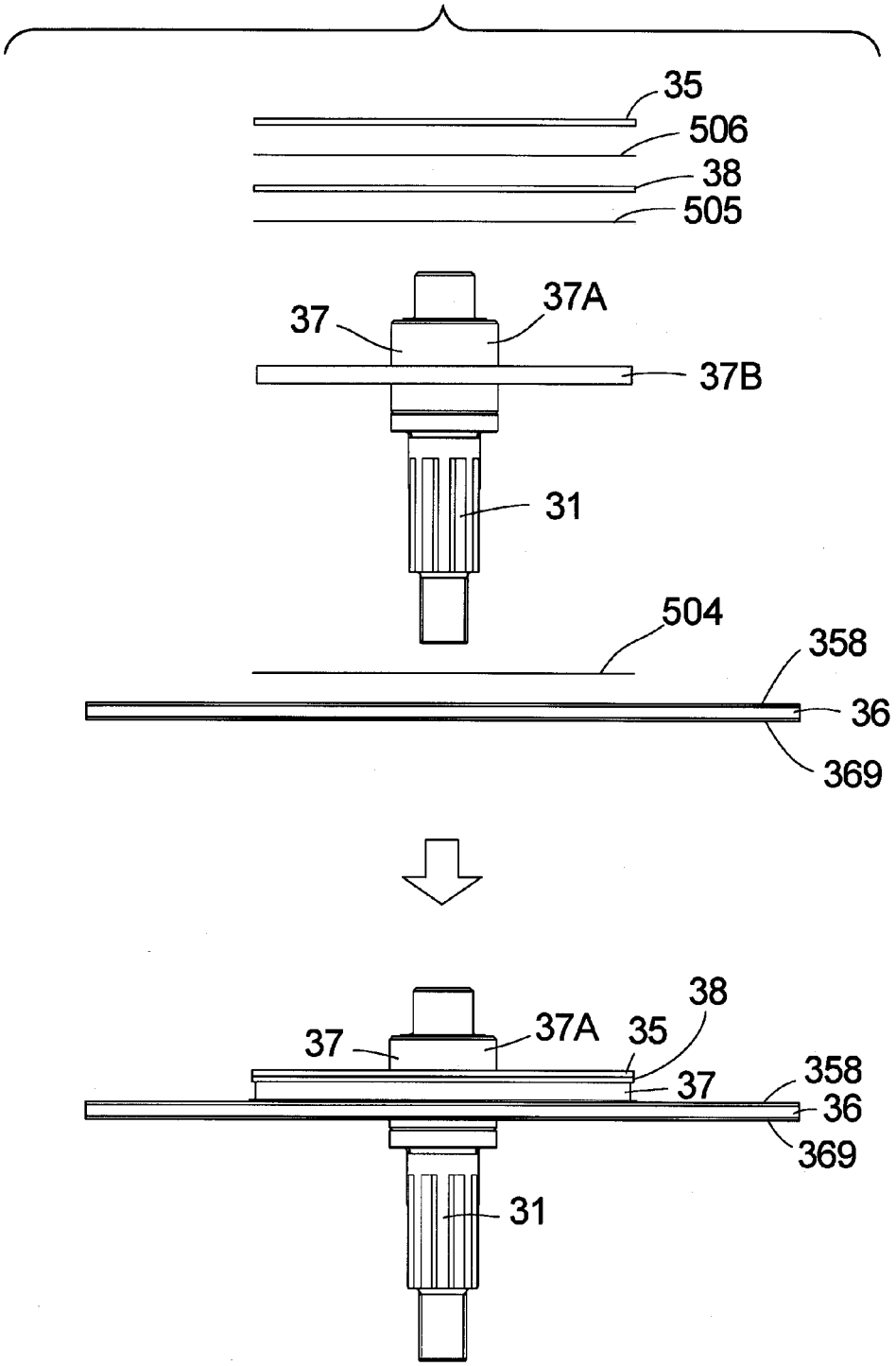
FIG. 12 is an assembly explanatory diagram of a rotor 82 shown in FIG. 10.
Figure 13:
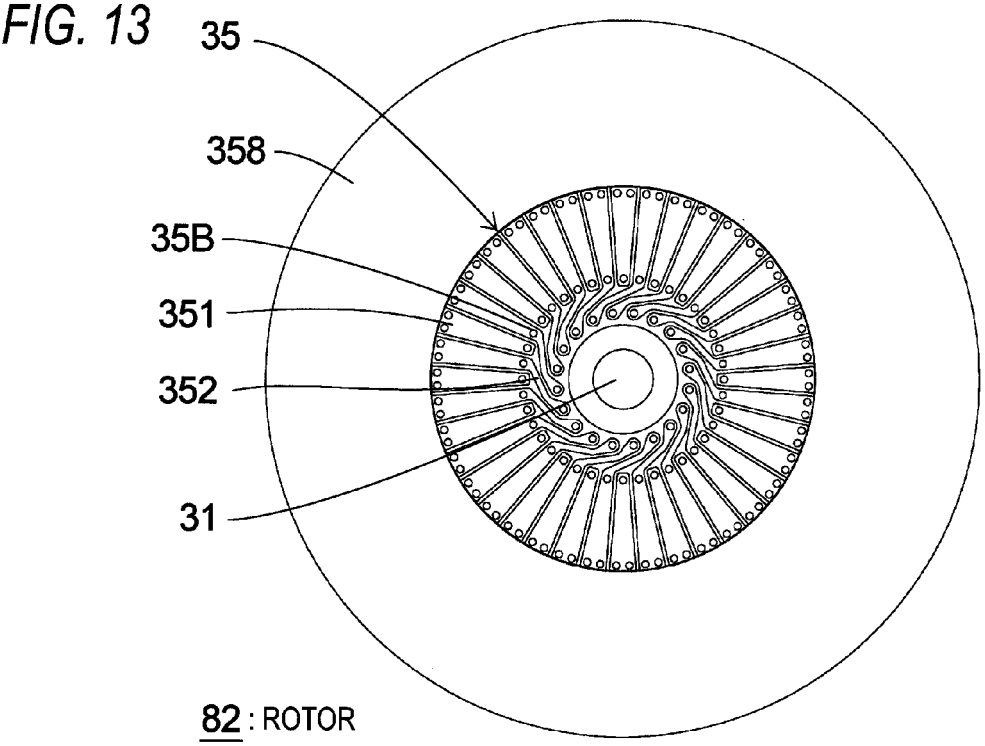
FIG. 13 is a plan view of the rotor 82 shown in FIG. 10.
Figure 14:
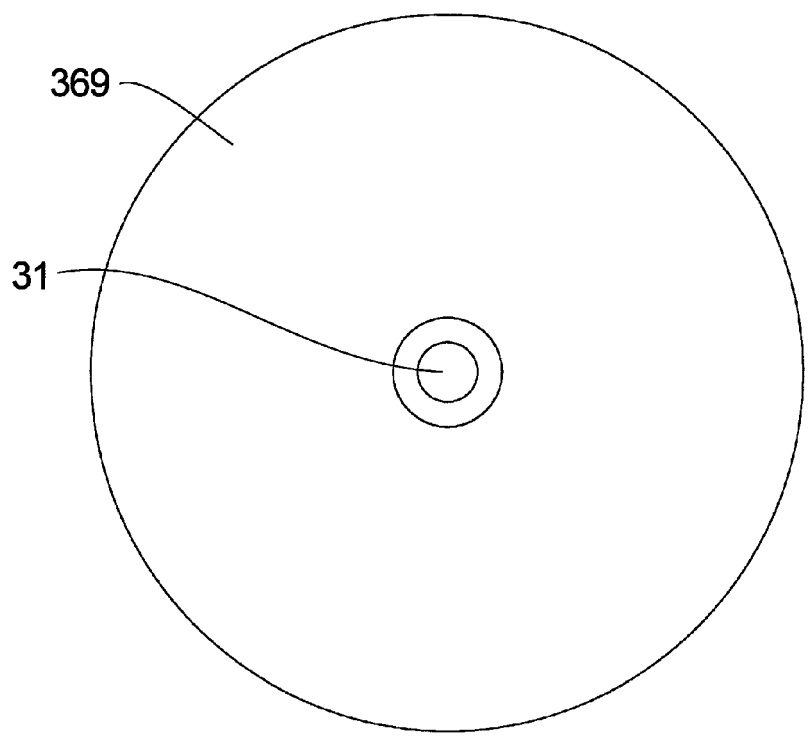
FIG. 14 is a bottom view of the rotor 82 shown in FIG. 10.

FIG. 10 is a front sectional view of a driving part 6 of a brushcutter according to a second exemplary embodiment of the invention. FIG. 11 is an assembly explanatory diagram of a coil part 36 shown in FIG. 10. FIG. 12 is an assembly explanatory diagram of a rotor 82 shown in FIG. 10. FIG. 13 is a plan view of the rotor 82 shown in FIG. 10. FIG. 14 is a bottom view of the rotor 82 shown in FIG. 10. The second exemplary embodiment differs mainly from the first exemplary embodiment in a structure of the rotor 82. The following description is based mainly on the difference between the first exemplary embodiment and the second exemplary embodiment.

As shown in FIG. 11, a coil substrate set is formed by laminating an insulating resin substrate 358 (for example, a glass fiber reinforced epoxy resin substrate that does not have a conductive pattern), a first coil disk 361 to a fourth coil disk 364 forming the coil part and an insulating resin substrate 369 with sheet-shaped adhesive layers 502 sandwiched therebetween. Then, the coil substrate group is adhered to a lower surface of a boss 37B through a sheet-shaped adhesive layer 504 as shown in FIG. 12. Also, a commutator disk 35 is adhered to an upper surface of the boss 37B through a sheet-shaped adhesive layer 505 having the same shape as that of the boss 37B when viewed in an axial direction, an insulating plate 38 and a sheet-shaped adhesive layer 506. In addition, the commutator disk 35 conducts the coil part 36 by forming, for example, a conductor pin (not shown) through the commutator disk 35, the boss 37B and the coil part 36. Thereafter, the portions ranging from the commutator disk 35 to the insulating resin substrate 369 are adhered and integrated in a laminated state by, for example, hot pressing. As is evident from FIGS. 10, 13 and 14, an upper surface of the coil part 36 is covered with the insulating resin substrate 358 and a lower surface of the coil part 36 is covered with the insulating resin substrate 369.

According to the present exemplary embodiment, the insulating resin substrate 369 adhered to the lower surface of the coil part 36 has effects (heat insulation and insulation) similar to those of the first exemplary embodiment. Also, the insulating resin substrate 358 adhered to the upper surface of the coil part 36 has effects (heat insulation and insulation) similar to those of the commutator pattern unformed portion 359 of the commutator disk 35 of the first exemplary embodiment. Also, since the insulating resin substrates 358, 369 are strongly adhered to the coil part 36 by hot pressing, there is a low risk of being peeled from the coil part 36 even when the rotor 82 is rotated at high speed. Further, as compared with the first exemplary embodiment, the commutator disk 35 is spaced from magnets 41 and heat transferring from the commutator disk 35 to the magnets 41 decreases, and thermal demagnetization can be prevented to have an advantage in reducing the cost for the magnets.

Third Exemplary Embodiment

Figure 15:
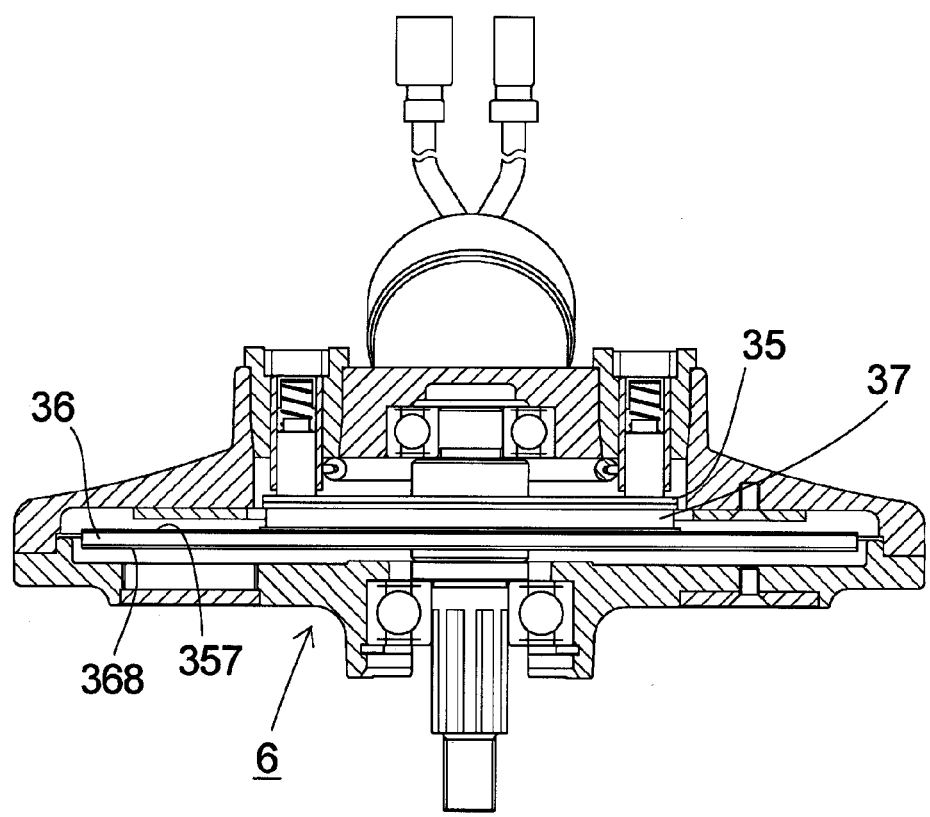
FIG. 15 is a front sectional view of a driving part 6 of a brushcutter according to a third exemplary embodiment of the invention.
Figure 16:
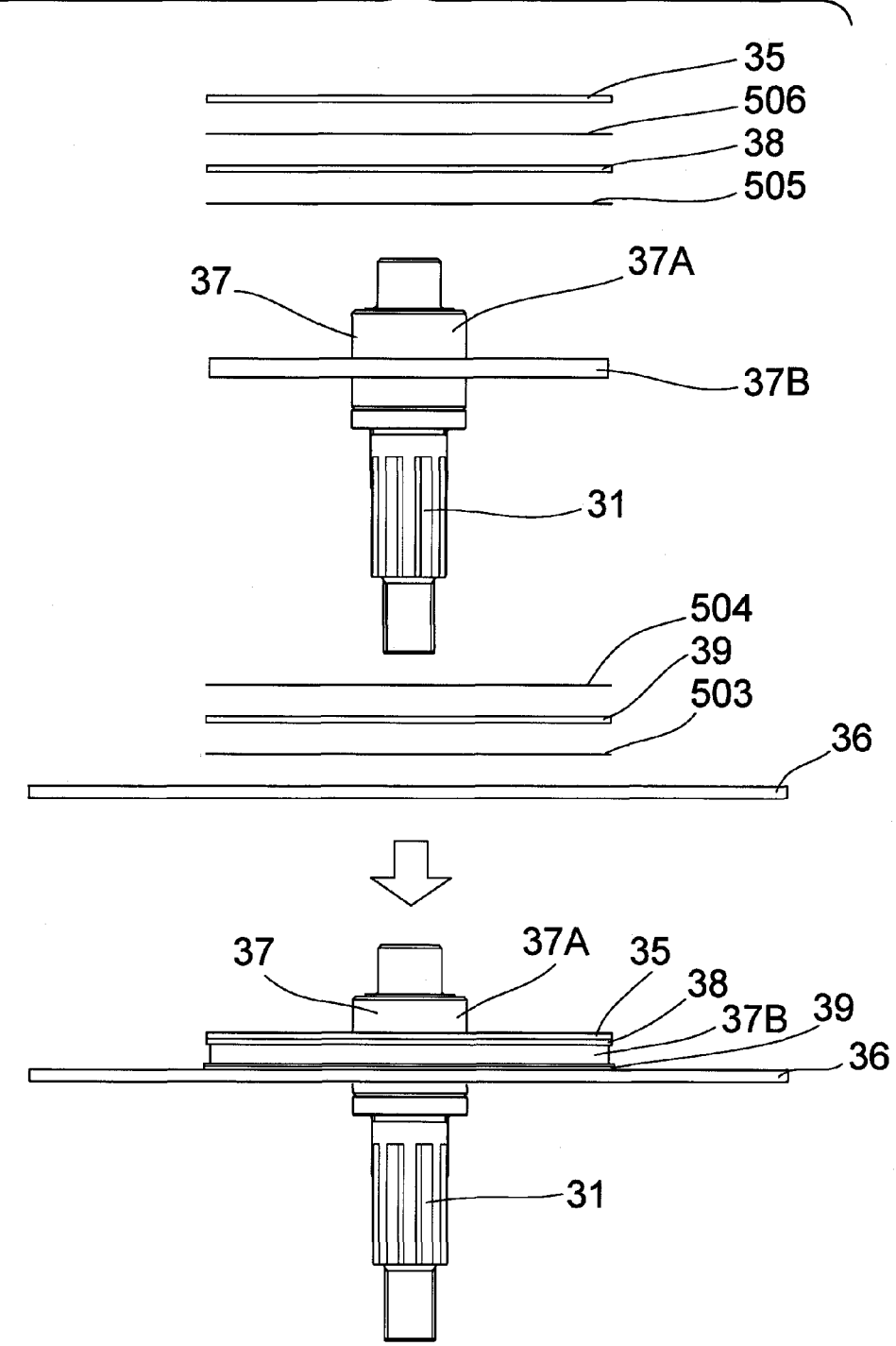
FIG. 16 is an assembly explanatory diagram of a rotor shown in FIG. 15.

FIG. 15 is a front sectional view of a driving part 6 of a brushcutter according to a third exemplary embodiment of the invention. The present exemplary embodiment differs from the second exemplary embodiment in that the insulating resin substrates 358, 369 of FIG. 10 are replaced with insulating resin tapes 357, 368 as shown in FIG. 15, and the other respects are similar. A coil part 36 obtained by laminating four coil disks through sheet-shaped adhesive layers is adhered to a lower surface of a boss 37B through a sheet-shaped adhesive layer 503, an insulating plate 39 and a sheet-shaped adhesive layer 504 as shown in FIG. 16. A commutator disk 35 is adhered to an upper surface of the boss 37B like the second exemplary embodiment. As shown in FIG. 17, the insulating resin tapes 357, 368 are adhered to upper and lower surfaces of the coil part 36 after the portions ranging from the commutator disk 35 to the coil part 36 are adhered and integrated in a laminated state by hot pressing. The insulating resin tape 357 has a ring shape in which a range where the commutator disk 35 (and the boss 37B) is provided is opened when viewed in an axial direction of an output shaft 31.

The present exemplary embodiment also has effects similar to those of the second exemplary embodiment in heat insulation and insulation. Also, since the insulating resin tapes 357, 368 are adhered after hot pressing, inexpensive tapes with low heat durability will be sufficient.

Fourth Exemplary Embodiment

Figure 18:
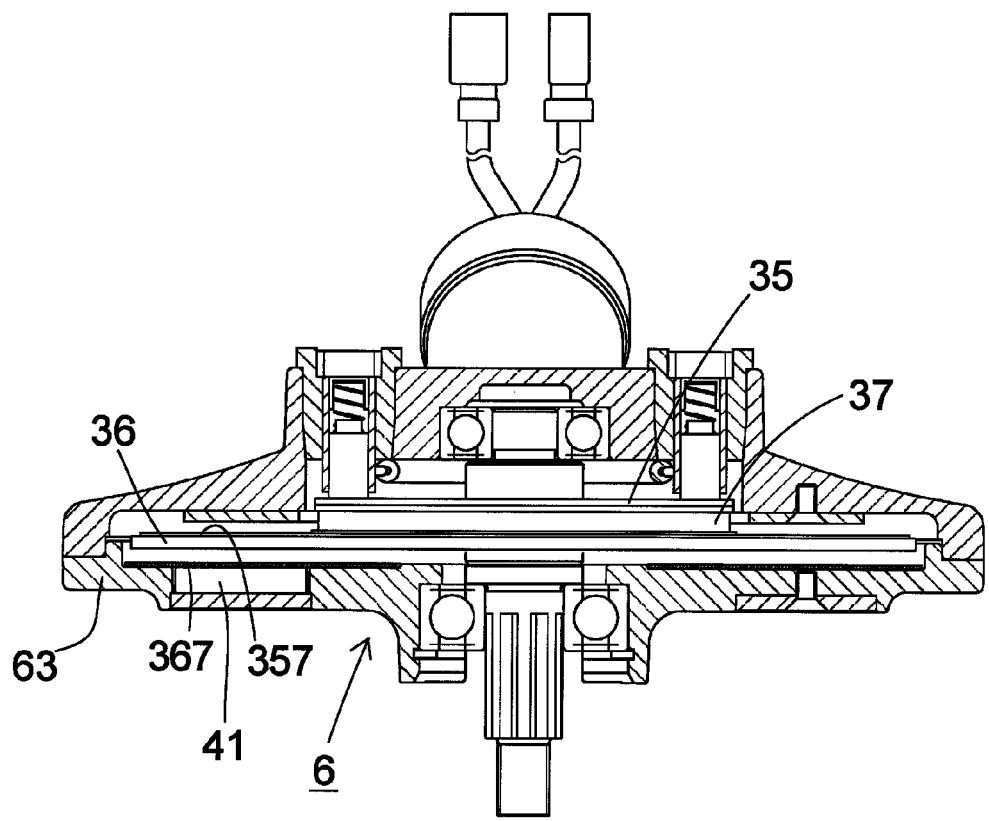
FIG. 18 is a front sectional view of a driving part 6 of a brushcutter according to a fourth exemplary embodiment of the invention.
Figure 19:
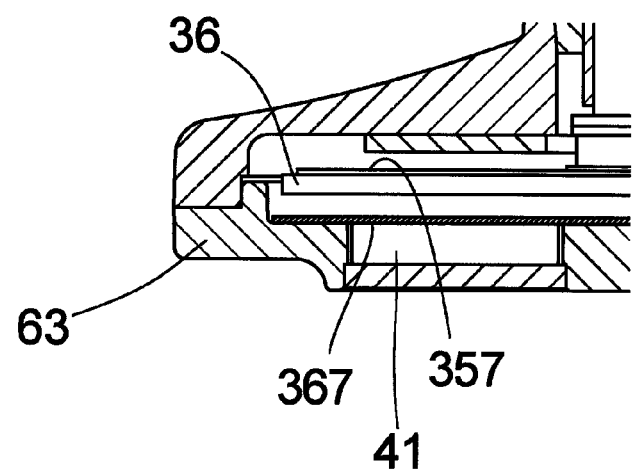
FIG. 19 is an enlarged view of a main part of FIG. 18.
Figure 20:
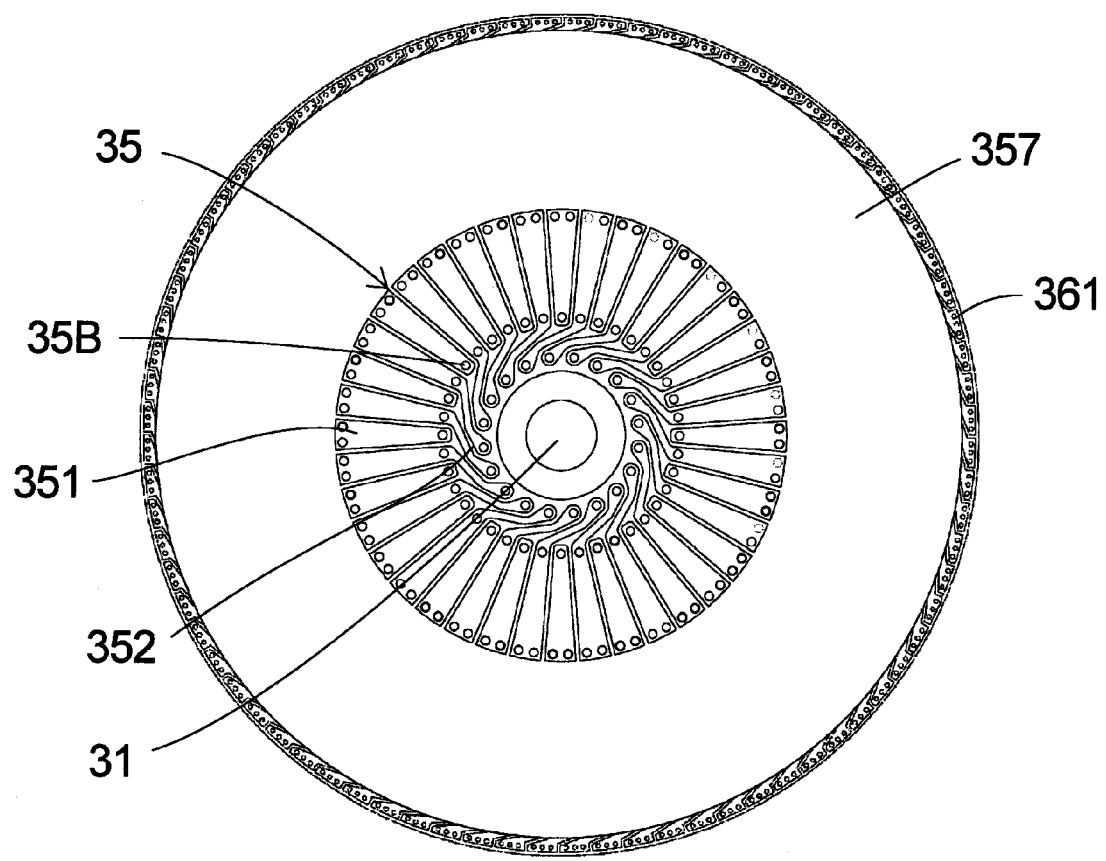
FIG. 20 is a plan view of a rotor of FIG. 18.

FIG. 18 is a front sectional view of a driving part 6 of a brushcutter according to a fourth exemplary embodiment of the invention. FIG. 19 is an enlarged view of a main part of FIG. 18. FIG. 20 is a plan view of a rotor of FIG. 18. The present exemplary embodiment differs from the third exemplary embodiment in that the insulating resin tape 368 of FIG. 15 is replaced with an insulating resin tape 367 of FIG. 18. The ring-shaped insulating resin tape 367 is adhered to an upper surface (inside bottom surface of a case) of the base part 63 so as to cover upper surfaces of all the magnets 41. Also, an insulating resin tape 357 is formed in a diameter slightly smaller than that of FIG. 15, and the vicinity of the outer edge of a first coil disk 361 is exposed as shown in FIG. 20. This is for preventing the insulating resin tape 357 from being peeled from the outside.

The present exemplary embodiment also has effects similar to those of the third exemplary embodiment. Also, since the insulating resin tape 367 is more distant from a coil part 36 as a heat generation part than the insulating resin tape 368 of the third exemplary embodiment, an inexpensive tape with lower heat durability will be sufficient. Also, since a centrifugal force of the rotor is not applied to the insulating resin tape 367, adhesive stability is high and surfaces of the magnets 41 can further be heat-insulated directly, so that heat insulation performance is high.

Fifth Exemplary Embodiment

Figure 21:
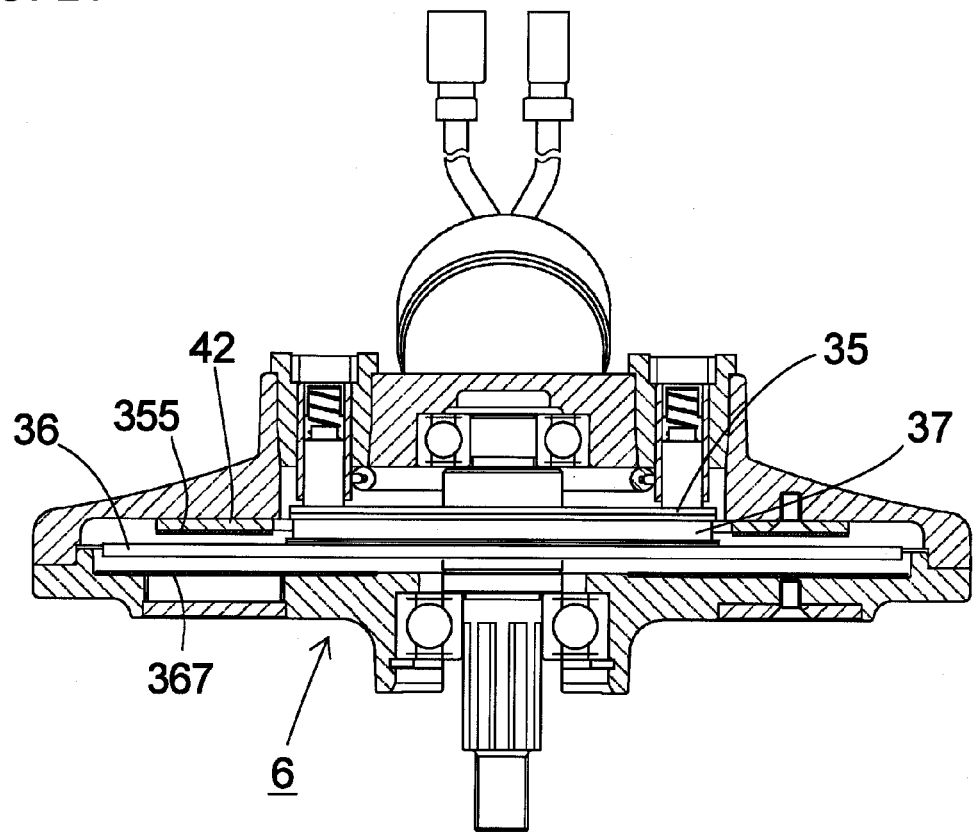
FIG. 21 is a front sectional view of a driving part 6 of a brushcutter according to a fifth exemplary embodiment of the invention.
Figure 22:
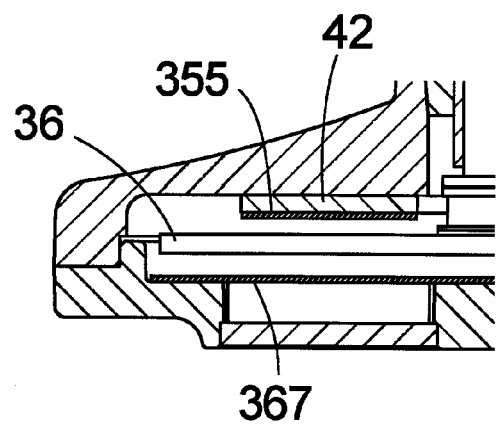
FIG. 22 is an enlarged view of a main part of FIG. 21.

FIG. 21 is a front sectional view of a driving part 6 of a brushcutter according to a fifth exemplary embodiment of the invention. FIG. 22 is an enlarged view of a main part of FIG. 21. The present exemplary embodiment differs from the fourth exemplary embodiment in that the insulating resin tape 357 of FIG. 18 is replaced with an insulating resin tape 355 of FIG. 21. The ring-shaped insulating resin tape 355 is adhered to an upper yoke 42 so as to cover the whole surface of the upper yoke 42 that faces a coil disk.

The present exemplary embodiment also has effects similar to those of the fourth exemplary embodiment. Also, since the insulating resin tape 355 is more distant from a coil part 36 as a heat generation part than the insulating resin tape 357 of the fourth exemplary embodiment, an inexpensive tape with lower heat durability will be sufficient. Also, since a centrifugal force of a rotor is not applied to the insulating resin tape 355, adhesive stability is high. Further, a surface of the upper yoke 42 proximally facing an upper surface of the coil part 36 can be heat-insulated directly, so that a high heat insulation can be achieved by using only a small amount of tape.

The invention has been described based on the exemplary embodiments. However, it will be understood by those skilled in the art that various modifications in each component or each processing process of the exemplary embodiments can be made within the scope described in the claims. Modified examples will hereinafter be mentioned.

The exemplary embodiments may be combined mutually. For example, the insulating resin substrate may be adhered to the upper surface of the coil part 36 and the insulating resin tape may be adhered to the lower surface of the coil part 36. The insulating resin tape may be adhered to the upper surface and the insulating resin substrate may be adhered to the lower surface. Further, for example, combinations of the insulating resin tape with which the magnets 41 are covered and the insulating resin substrate with which the upper surface of the coil part 36 is covered, or combinations of the insulating resin substrate with which the lower surface of the coil part 36 is covered and the insulating resin tape with which the upper yoke 42 is covered, are also effective.

It is unnecessary that shapes of the coil disk and the commutator disk have a precise circular plate shape. However, it is preferred that the shapes of the coil disk and the commutator disk are in the range regarded as substantially a circle when viewed in an axial direction.

The output shaft 31 and the support member 37 may be formed separately as shown in the exemplary embodiments, or may be formed integrally.

The boss 37B may have a diameter smaller than that of the commutator disk 35, and this can have a function as positioning of the coil disk and the commutator disk with respect to the output shaft 31. Also, when the diameter is a diameter equal to or larger than a distance between a pair of brushes 83, it is desirable in that the strength of the rotor 82 can be improved.

In addition, the number of magnets, an angular pitch of the arranged magnets, the number of rounds of the coil pattern (the number of rows of the coil pattern), the number of laminations of the coil disk, the number of through holes or pin insertion holes, and other parameters can be set properly according to cost or performance required. Also, the number of rounds of the coil pattern may differ in every coil disk. In addition, when the coil pattern has only one line, the terms of "partial coil pattern group", "inside communication pattern group", "radial pattern group" and "outside communication pattern group" described in the exemplary embodiments are read by excluding the word "group".

The electric working machine is not limited to the brushcutter shown in the exemplary embodiments and may be various electric tools having a rotary driving part implemented by a disk motor. For example, the electric working machine may be a rotary band saw or a belt sander equipped with the disk motor.

The invention may also be applied to a brushless motor where a rotor functions as the magnet generating portion and a stator is provided with the coil disk. Further, in a brushless motor, it is not necessary to provide a commutator disk.

What is claimed is:
1. A disk motor comprising:
a rotor;
a stator;

at least one coil disk provided to the rotor;

a plurality of magnets provided to the stator and arranged in a circular configuration facing a coil pattern of the coil disk;

first and second yokes that follow the circular configuration of the arranged magnets when viewed in an axial direction of the output shaft, the coil disk being positioned between the first yoke and the plural magnets, and the plural magnets being positioned between the coil disk and the second yoke, a current supply part for supplying current to the coil pattern through a commutator disk;

an output shaft rotated by a rotating force of the rotor;

an insulating resin layer provided between the coil pattern and the magnet; and a second insulating resin which covers at least a part of a facing surface of the first yoke that faces the coil disk.

2. The disk motor according to claim 1, wherein the insulating resin layer contacts with a facing surface of the magnet that faces the coil disk and covers at least a part of the facing surface.

3. The disk motor according to claim 2, further comprising a case configured to hold the magnet and cover at least the commutator disk and the coil disk, wherein the insulating resin layer is adhered to an inside of the case so as to cover the facing surface of the magnet.

4. The disk motor according to claim 3, wherein the case is made of metal.

5. The disk motor according to claim 1, wherein the insulating resin layer contacts with a facing surface of the coil disk that is nearest to the magnet and covers at least a part of the facing surface of the coil disk.

6. The disk motor according to claim 5, wherein the insulating resin layer is an insulating resin substrate that has a diameter substantially the same as a diameter of the coil disk, does not have a conductive pattern and is laminated and is integrated with the facing surface of the coil disk.

7. The disk motor according to claim 1, wherein the insulating resin layer is a tape made of insulating resin.

8. The disk motor according to claim 1, wherein the second insulating resin layer is a tape made of insulating resin.

9. The disk motor according to claim 1, wherein the insulating resin layer is provided between the coil pattern and the magnet in an axial direction of the output shaft.

10. An electric working machine comprising the disk motor according to claim 1.

11. A disk motor comprising:

a rotor;

a stator;

at least one coil disk provided to the rotor;

at least one magnet provided to the stator and facing a coil pattern of the coil disk;

a current supply part for supplying current to the coil pattern through a commutator disk;

an output shaft rotated by a rotating force of the rotor;

an insulating resin layer provided between the coil pattern and the magnet; and another insulating resin layer which covers at least a part of an opposite surface of the coil disk that is farthest from the magnet, the opposite surface being opposite to the magnet.

12. The disk motor according to claim 11, wherein the other insulating resin layer is an insulating resin substrate that has a diameter substantially the same as a diameter of the coil disk, does not have a conductive pattern and is laminated and integrated with the opposite surface of the coil disk that is farthest from the magnet.

13. A disk motor comprising:

a rotor;

a stator;

at least one coil disk provided to the rotor;

at least one magnet provided to the stator and facing a coil pattern of the coil disk;

a current supply part for supplying current to the coil pattern through a commutator disk;

an output shaft rotated by a rotating force of the rotor; and an insulating resin layer provided between the coil pattern and the magnet, wherein the commutator disk is configured by forming a commutator pattern to an insulating resin substrate that has a diameter substantially the same as a diameter of the coil disk, is laminated coaxially with the coil disk and includes a commutator pattern unformed portion at a region which is spaced from a center thereof by a predetermined distance or more.

* * * * *